United States Patent
Koana

(10) Patent No.: US 7,495,476 B2
(45) Date of Patent: *Feb. 24, 2009

(54) LOGIC CIRCUIT, SYSTEM FOR REDUCING A CLOCK SKEW, AND METHOD FOR REDUCING A CLOCK SKEW

(75) Inventor: Masahiro Koana, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/831,648

(22) Filed: Jul. 31, 2007

(65) Prior Publication Data

US 2008/0036498 A1 Feb. 14, 2008

Related U.S. Application Data

(63) Continuation of application No. 11/068,748, filed on Mar. 2, 2005, now Pat. No. 7,310,007.

(30) Foreign Application Priority Data

Sep. 15, 2004 (JP) .............................. 2004-268539

(51) Int. Cl.
H03K 19/00 (2006.01)
(52) U.S. Cl. .......................................... 326/93; 326/38
(58) Field of Classification Search ................... 326/37, 326/38, 46, 93–98
See application file for complete search history.

(56) References Cited

U.S. PATENT DOCUMENTS

| 5,862,373 | A | 1/1999 | Pathikonda et al. |
| 6,053,950 | A | 4/2000 | Shinagawa |
| 6,440,780 | B1 * | 8/2002 | Kimura et al. ............... 438/129 |
| 6,459,310 | B1 | 10/2002 | Thomson et al. |
| 6,559,701 | B1 | 5/2003 | Dillon |
| 7,138,829 | B1 * | 11/2006 | Dalvi .......................... 326/41 |
| 7,352,212 | B2 * | 4/2008 | Nieh et al. .................... 326/93 |
| 2004/0021485 | A1 * | 2/2004 | Kanazawa ................... 326/83 |
| 2004/0128579 | A1 | 7/2004 | Khondker et al. |

FOREIGN PATENT DOCUMENTS

| JP | 3-177913 | 8/1991 |
| JP | 5-314785 | 11/1993 |
| JP | 7-29389 | 1/1995 |
| JP | 7-321208 | 12/1995 |
| JP | 10-334685 | 12/1998 |
| JP | 11-272353 | 10/1999 |
| JP | 2000-348083 | 12/2000 |
| JP | 2001-22816 | 1/2001 |

* cited by examiner

*Primary Examiner*—Don P Le
(74) *Attorney, Agent, or Firm*—Oblon, Spivak, McClelland, Maier & Neustadt, P.C.

(57) ABSTRACT

A logic circuit includes a first flip-flop configured to include a first input terminal introducing a clock, a first output terminal supplying the clock and a first internal wiring connecting the first input terminal and the first output terminal, and a second flip-flop configured to be adjacent to the first flip-flop and be supplied with the clock from the first output terminal.

3 Claims, 9 Drawing Sheets

LOGIC CIRCUIT, SYSTEM FOR REDUCING A CLOCK SKEW, AND METHOD FOR REDUCING A CLOCK SKEW

CROSS REFERENCE TO RELATED APPLICATIONS

This application is a continuation of and claims the benefit of priority under 35 USC §120 from U.S. Ser. No. 11/068, 748, filed Mar. 2, 2005 and is based upon and claims the benefit of priority under 35 USC §119 from prior Japanese Patent Application P2004-268539 filed on Sep. 15, 2004, the entire contents of both of which are incorporated herein by reference.

BACKGROUND OF THE INVENTION

1. Field of the Invention

The present invention relates to a technology for designing a logic circuit in an LSI.

2. Description of the Related Art

The formation of clock trees and clock wirings are carried out after entire cells are completely located. In particular, upon completely placing the entire cells, with a view to satisfying limitations in timing of a clock signal, a location tool calculates a location of a clock buffer and paths of clock wirings in a way to minimize clock skew in a flip-flop (F/F).

As disclosed in Japanese Patent Provisional Publication No. 11-119853, a clock tree synthesis (CTS) processing is known as a procedure for minimizing clock skew in an F/F. By the "CTS processing" is meant that the F/Fs are divided into a plurality of clusters to allow the F/Fs, which belong to a particular cluster, to be connected in an equalized wiring distance while further connecting the plurality of clusters in the equalized wiring distance whereupon the plurality of clusters are further connected in the equalized wiring distance. Thus, the wiring processing is carried out in the equalized wiring distance in a connection from the F/F to a clock supply source and in bottoming up, minimizing clock skew in the F/Fs.

In the related art technology, a clock wiring delay between a buffer cell (hereinafter referred to as a "final stage buffer cell"), from which a clock is directly supplied to the F/Fs, and a clock input pin of each F/F is adjusted upon estimation and remains unchanged in a predicted value until detailed wirings are actually carried out, resulting in variations. Further, in relation to limitations in an output size of a final stage clock buffer and a location resource, it is extremely difficult to allow the final stage clock buffer to be evenly located with respect to any F/Fs and to perform clock wirings. Therefore, a major portion of clock skew occurs not in an area between the clock supply source and the final stage buffer but in an area between the final stage buffer cell and the clock input pins of the respective F/Fs. Further, in recent years, a remarkable speeding-up occurs in a semiconductor integrated circuit and a delay resulting from wiring resistance, accompanied by the miniaturization in a process, and wiring capacities are relatively higher than a cell delay. Accordingly, clock skew results in an increase in adverse affect on an operating speed of the semiconductor integrated circuit. In the meanwhile, an attempt has been undertaken to insert a delay cell as a measure against holds, resulting in an increase in a surface area of the semiconductor chip and a drop in the operating speed of the semiconductor integrated circuit.

SUMMARY OF THE INVENTION

An aspect of the present invention inheres in a logic circuit including a first flip-flop configured to include a first input terminal introducing a clock signal, a first output terminal supplying the clock signal and a first internal wiring connecting the first input terminal and the first output terminal, and a second flip-flop configured to be adjacent to the first flip-flop and be supplied with the clock signal from the first output terminal.

Another aspect of the present invention inheres in a system including a final stage buffer cell specifying unit configured to specify a final stage buffer cell supplying a clock signal to a flip-flop in a logic circuit, an F/F specifying unit configured to specify the flip-flop supplied with the clock signal from the final stage buffer cell, and an F/F locating unit configured to locate the flip-flop in the position adjacent to the final stage buffer cell.

Still another aspect of the present invention inheres in a method including specifying a final stage buffer cell supplying a clock signal to a flip-flop in a logic circuit, specifying the flip-flop supplied with the clock signal from the final stage buffer cell, and locating the flip-flop in the position adjacent to the final stage buffer cell.

DETAILED DESCRIPTION OF EMBODIMENTS

Figure 1:
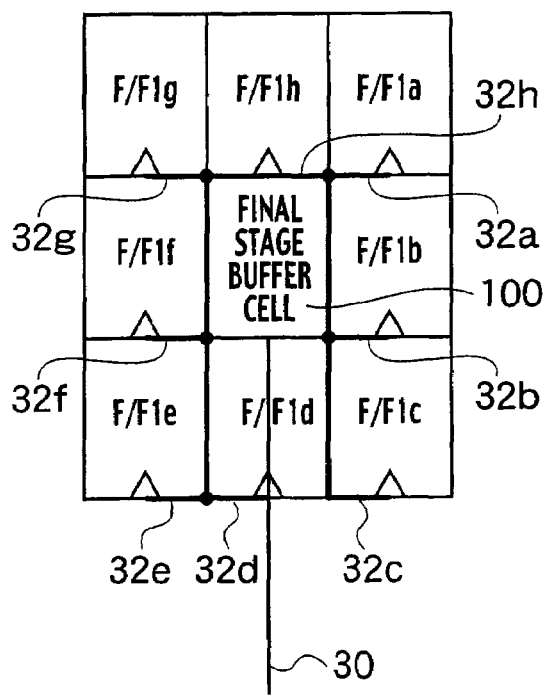
FIG. 1 is a view showing an example of a logic circuit of a first embodiment according to the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following description specific details are set forth, such as specific materials, process and equipment in order to provide thorough understanding of the present invention. It will be apparent, however, to one skilled in the art that the present invention may be practiced without these specific details. In other instances, well-known manufacturing materials, process and equipment are not set forth in detail in order not unnecessary obscure the present invention.

As shown in FIG. 1, a logic circuit of a first embodiment according to the present invention is comprised of a wiring 30 through which a clock signal is delivered, a final stage buffer cell 100 to which the clock signal is delivered through the wiring and inputted for amplification, and F/F1$a$ to F/F1$h$. The final stage buffer cell 100 supplies the clock signal to click input terminals of the F/F1$a$ to F/F1$h$ via wirings 32$a$ to 32$h$.

Figure 2:
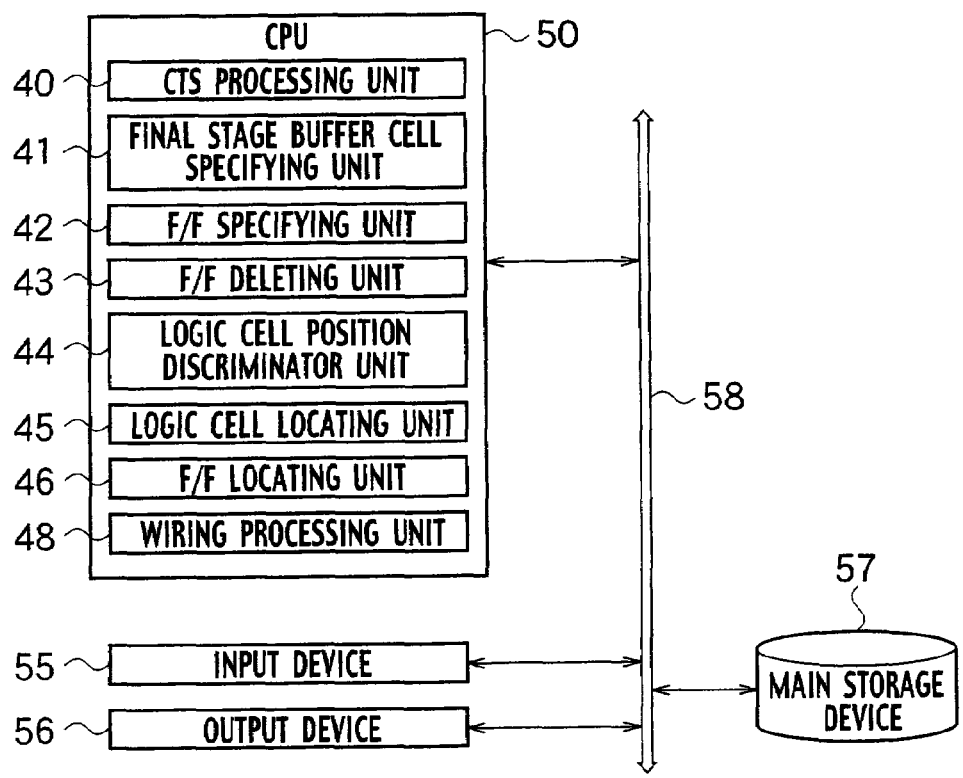
FIG. 2 is a view showing an example of a clock skew reduction system of the first embodiment according to the present invention.

As shown in FIG. 2, a clock skew reduction system of the first embodiment according to the present invention is comprised of a bus 58 and an input device 55 connected to the bus 58, an output device 56, a CPU 50 and a main storage device 57. The CPU 50 includes a CTS processing unit 40, a final stage buffer cell specifying unit 41, an F/F specifying unit 42, an F/F deleting unit 43, a logic cell position discriminator unit 44, a logic cell locating unit 45, an F/F locating unit 46 and a wiring processing unit 48. The input device 55 allows a logic circuit, prior to processing the wirings, to be inputted to the main storage device 57 as data. The output device 56 outputs data, stored in the main storage device 57, and data, or the like, processed in the CPU 50. The main storage device 57 stores data, inputted from the input device 55, and data, or the like, processed by the CPU 50.

Figure 3:
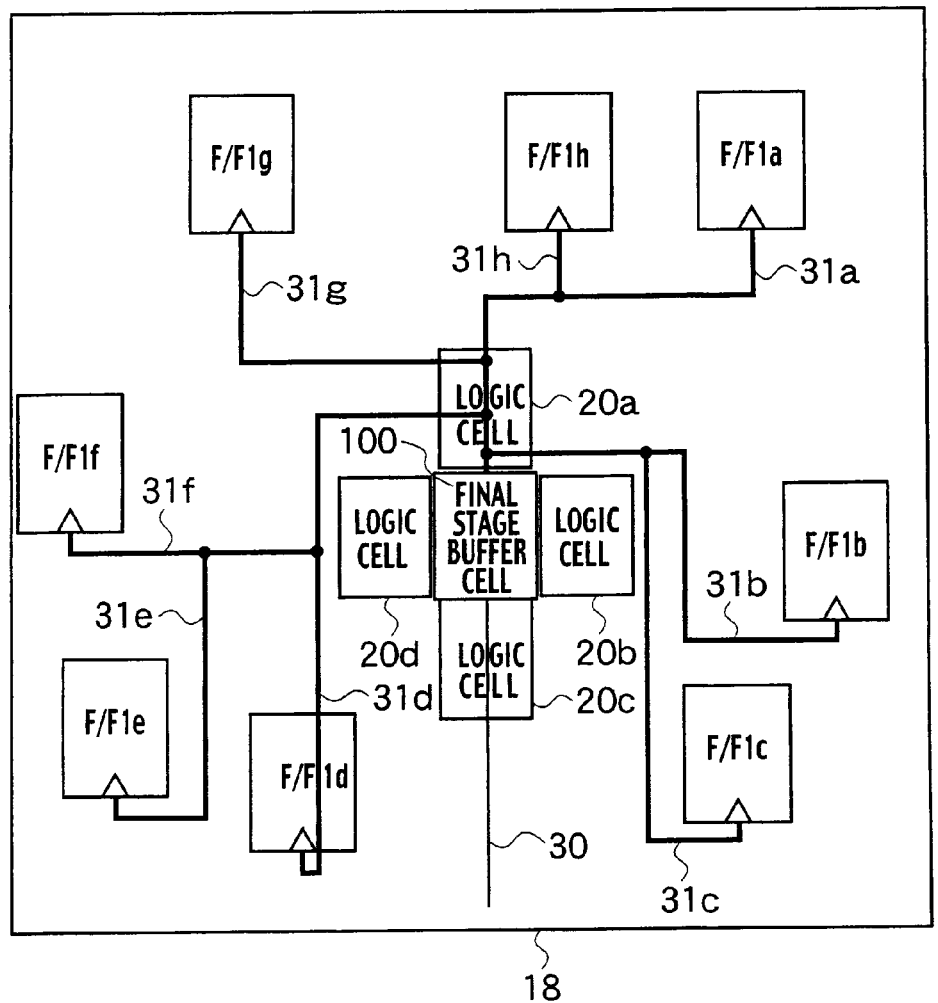
FIG. 3 is a view showing an example of the logic circuit subjected to CTS processing.

As shown in FIG. 3, the CTS processing unit 40 executes CTS operation on a semiconductor substrate 18 through the wirings 30 and 31$a$ to 31$h$ for the F/F1$a$ to F/F1$h$ inputted from the input device 55 as data. The final stage buffer cell specifying unit 41 specifies a buffer cell, by which the clock signal is directly applied to the F/F, as the final stage buffer cell 100 on a logic circuit that is subjected to the CTS operation. The F/F specifying unit 42 specifies the F/F1$a$ to F/F1$h$ to which the clock signal is applied from the final stage buffer cell 100 specified by the final stage buffer cell specifying unit 41. The F/F deleting unit 43 deletes the wirings 31$a$ to 31$h$ to be connected to the F/F1$a$ to F/F1$h$ and F1$a$ to F1$h$ that are specified by the F/F specifying unit 42. The logic cell position discriminator unit 44 discriminates whether there are logic cells 20$a$ to 20$d$ adjacent to the final stage buffer cell 100 specified by the final stage buffer cell specifying unit 44. The logic cell locating unit 45 locates the logic cells 20$a$ to 20$d$ in associated positions from which the F/F deleting unit 43 deletes the F/F1$a$ to F/F1$h$. The F/F locating unit 46 locates the F/F1$a$ to F/F1$h$, which are specified by the F/F specifying unit 42, in associated positions adjacent to the final stage buffer cell 100. The wiring locating unit 48 lays down the wirings 32$a$ to 32$h$, connected to the F/F1$a$ to F/F1$h$, and the other associated wirings.

Figure 4:
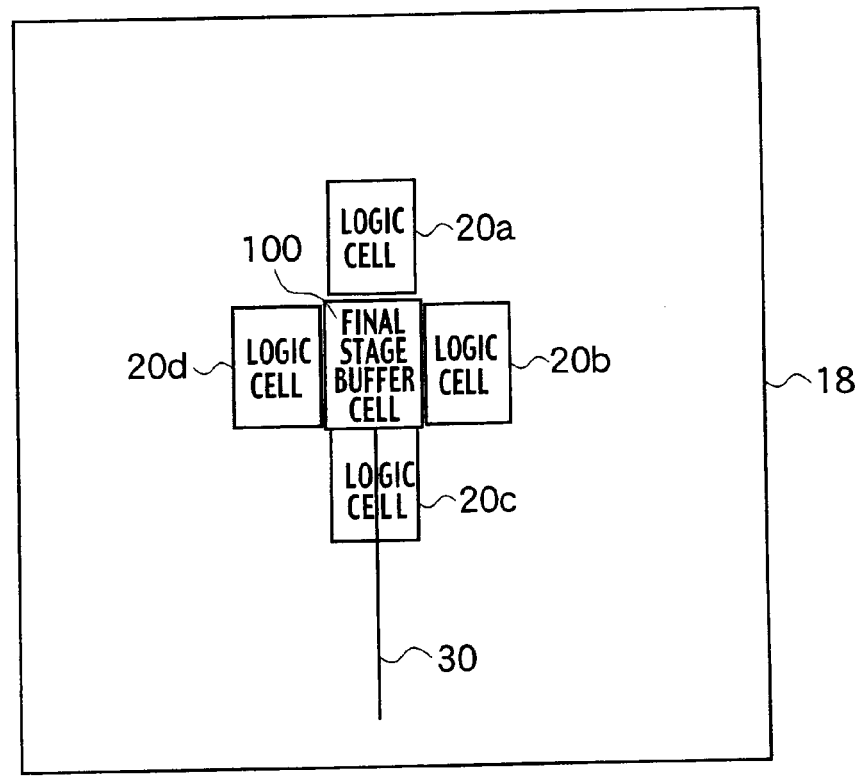
FIG. 4 is a flowchart illustrating one example of a clock skew reduction method of the first embodiment according to the present invention.
Figure 5:
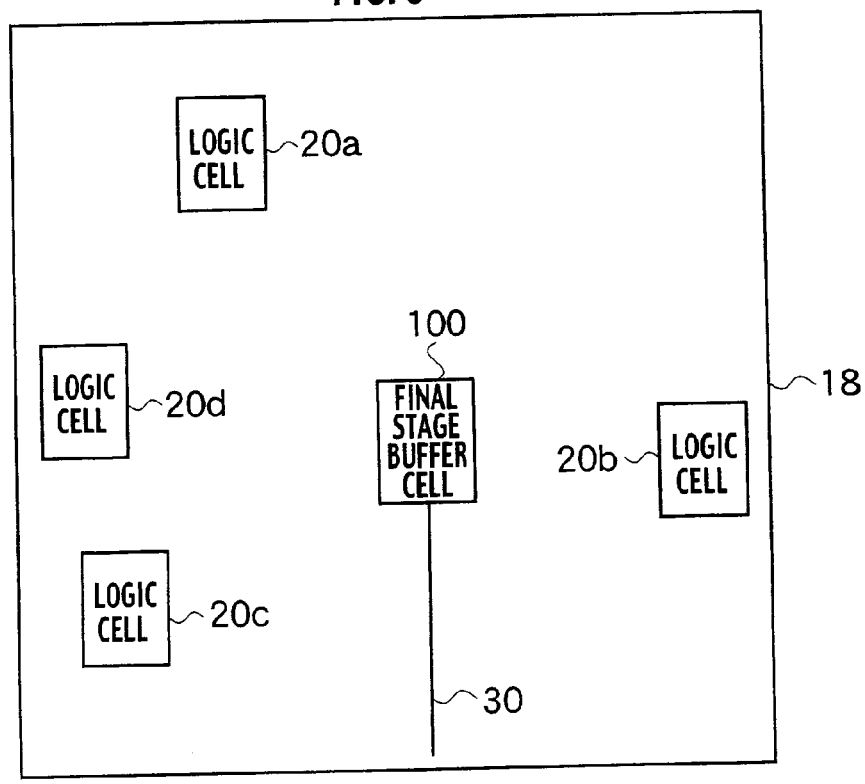
FIG. 5 is a view illustrating one example of a logic circuit from which F/Fs and wirings connected to the F/Fs are deleted.
Figure 6:
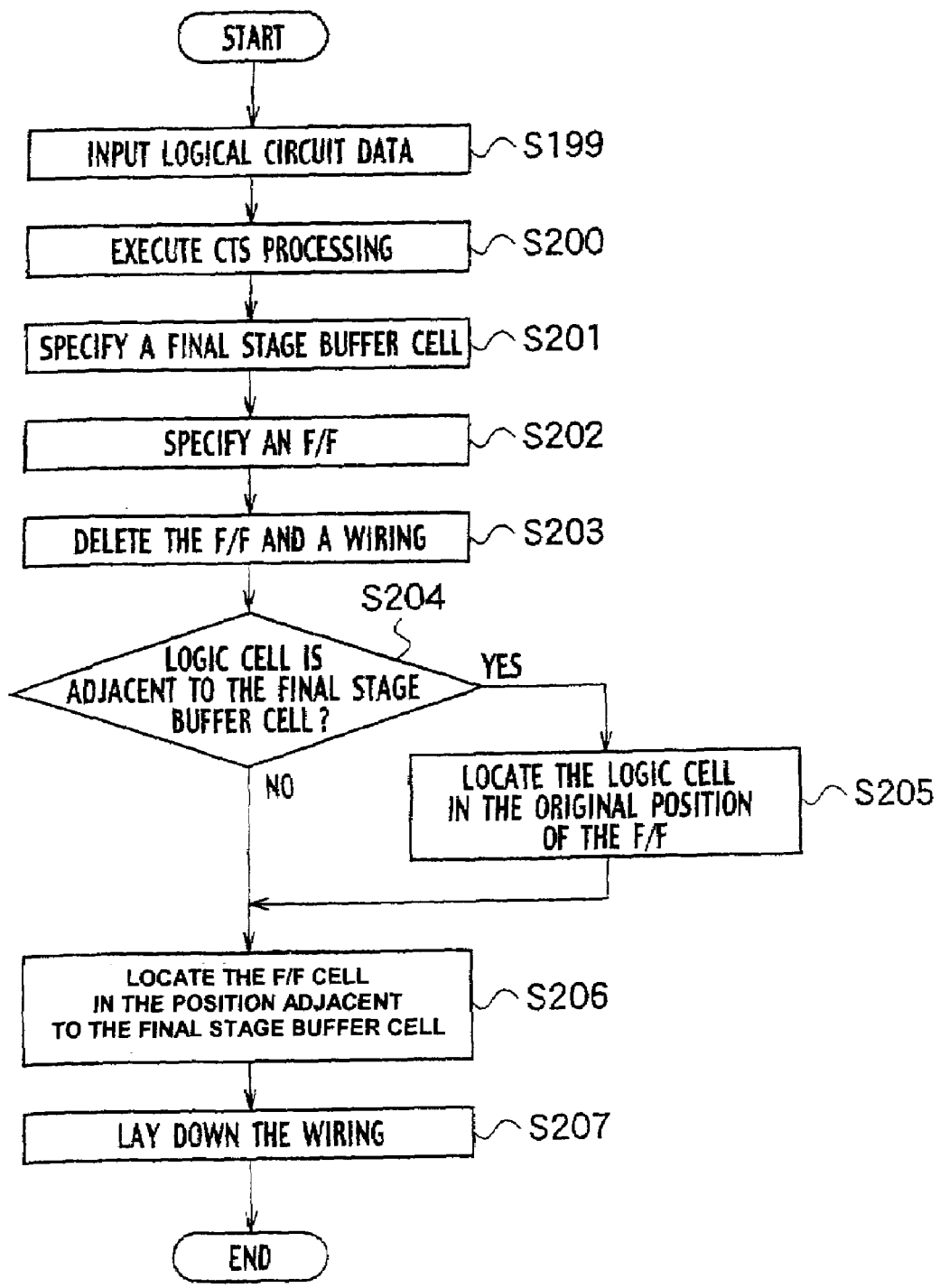
FIG. 6 is a view illustrating one example of a logic circuit in which a logic cell is placed in a position from which the F/Fs are deleted.

Now, a method of deleting a clock skew of the first embodiment according to the present invention is described with reference to FIG. 6 while referring to FIG. 4 and FIG. 5.

(a) First, in step S199, the input device 55 stores the logic circuit to the main storage device 57 as data. In step S200, the CTS processing unit 40 executes the CTS processing for the F/F1$a$ to F/F1$h$ of the logic circuit inputted by the input device 55 as shown in FIG. 3. In step S201, the final stage buffer cell specifying unit 41 specifies the buffer cell, from which clocks are directly supplied to F/F, as the final stage buffer cell 100 in the logic circuit that is subjected to the CTS processing. In step S202, the F/F specifying unit 42 specifies the F/F1$a$ to F/F1$h$, to which the clocks are supplied from the final stage buffer cell 100 specified by the final stage buffer cell specifying unit 41. In step S203, as shown in FIG. 5, the F/F deleting unit 43 deletes the F/F1$a$ to F/F1$h$ shown in FIG. 3 and the associated wirings 31$a$ to 31$h$ connected to the F/F1$a$ to F/F1$h$.

(b) In step S204, the logic cell position judgment unit 44 discriminates whether there are the logic cells 20$a$ to 20$d$ adjacent to the final stage buffer cell 100 specified by the final stage buffer cell specifying unit 41. In a case where there are the logic cells adjacent to the final stage buffer cell 100 in step S204, in step S205, the logic cell locating unit 45 locates the logic cells 20$a$ to 20$d$ adjacent to the final stage buffer cell 100 in the positions from which the F/F1$a$ to F/F1$h$ are deleted, upon which the operation proceeds to step S206. For instance, as shown in FIG. 4, the logic cells 20$a$ to 20$d$ adjacent to the final stage buffer cell 100 are located in the positions from which the F/F1$g$, the F/F1$b$, the F/F1$e$, the F/F1$f$ are deleted, respectively. In the absence of the logic cells adjacent to the final stage buffer cell 100 specified in step S204, the operation proceeds to step S206.

(c) In step S206, the F/F locating unit 46 locates the F/F1$a$ to F/F1$h$, specified by the F/F specifying unit 42, in the positions adjacent to the final stage buffer cell 100. In step S207, the wiring processing unit 48 lays down the wirings 32$a$ to 32$h$, adjacent to the final stage buffer cell 100, and other wirings (not shown), which are connected to the F/F1$a$ to F/F1$h$, from the final stage buffer cell 100.

With the logic circuit, the clock skew reduction system and the clock skew reduction method of the first embodiment according to the present invention, since the F/F1$a$ to F/F1$h$ is placed adjacent to the final stage buffer cell 100, less variations exist in lengths of the wirings connected between the final stage buffer cell 100 and the respective F/F1$a$ to F/F1$h$, resulting in reduction in clock skew among the F/Fs. Also, a semiconductor chip has a reduced surface area to prevent a drop in an operating speed of a semiconductor integrated circuit, minimizing power consumption of the semiconductor integrated circuit.

Figure 7:
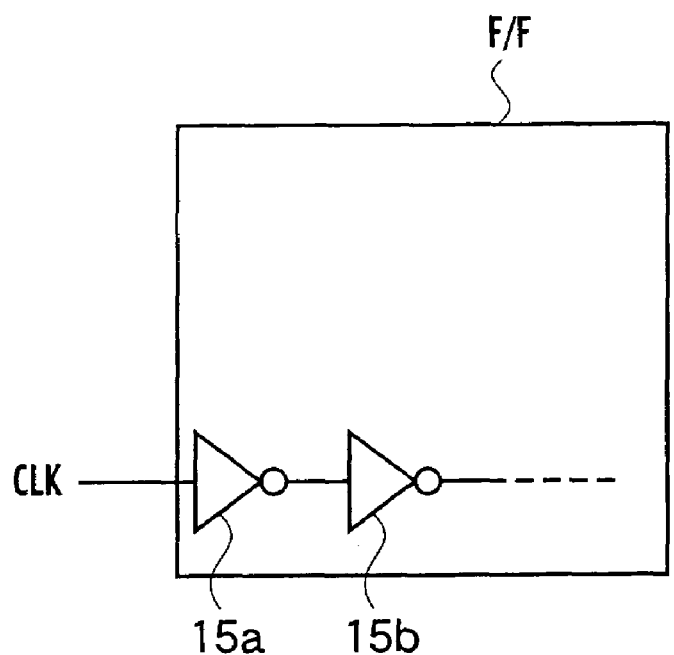
FIG. 7 is a view showing an F/F equipped with a clock buffer.
Figure 8:
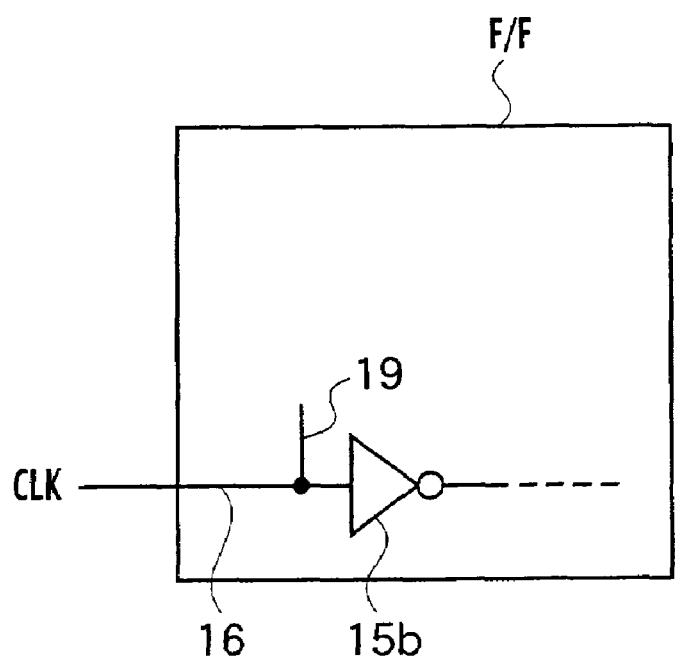
FIG. 8 is a view showing one example of an F/F, from which a clock buffer in the F/F is deleted, in the logic circuit of the first embodiment according to the present invention.

In the logic circuit of the first embodiment according to the present invention, clock buffers inside the F/F1$a$ to F/F1$h$ may be deleted. As shown in FIG. 7, the related art F/F operates such that a clock is inverted and amplified by a clock buffer 15$a$ and reversed in an inverter 15$b$. With the logic circuit of the first embodiment according to the present invention, as shown in FIG. 8, the clock buffer 15$a$ may be deleted. In this case, the clock is inverted in the inverter 15$b$. The clock, which is not inverted, is supplied through a new wiring 19 diverged from a wiring 16 to which the inverter 15b is connected. Deleting the clock buffer 15$a$ allows reduction in a surface area of a semiconductor chip. Also, deleting the clock buffer 15$a$ allows reduction in a delay of a clock occurring in the clock buffer 15$a$. On the other hand, since the F/F 1*a* to F/F1*h* is placed adjacent to the final stage buffer cell 100, the F/F1*a* to F/F1*h* are driven even if the clock buffer 15*a* is deleted.

Second Embodiment

Figure 9:
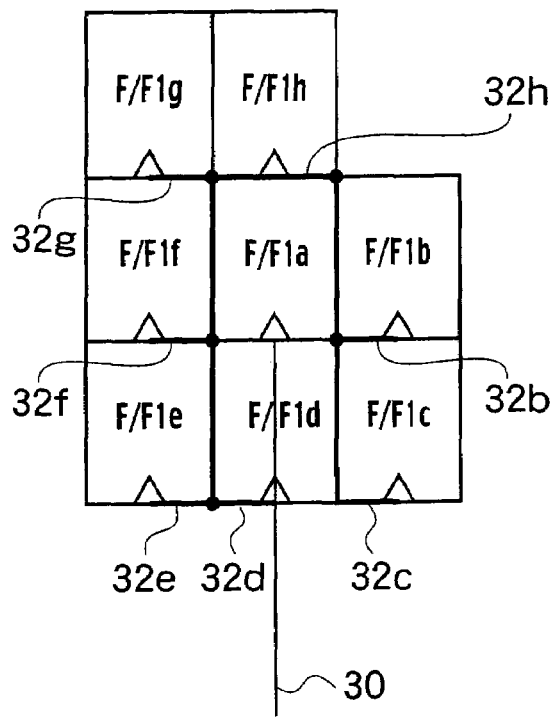
FIG. 9 is a view showing an example of a logic circuit of a second embodiment according to the present invention.
Figure 10:
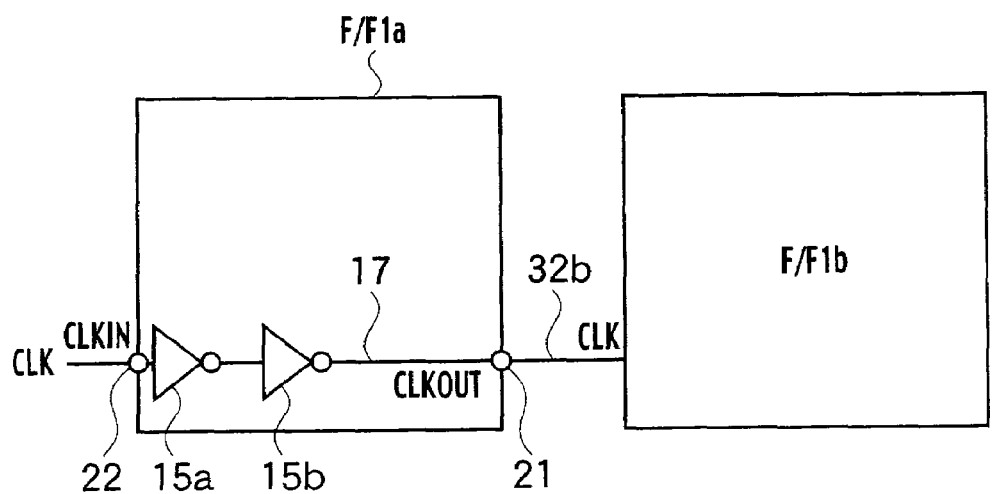
FIG. 10 is a view showing an example of an F/F, equipped with a clock output terminal, in the logic circuit of the second embodiment according to the present invention.

As shown in FIG. 9, a logic circuit of a second embodiment according to the present invention is comprised of a wiring 30 through which a clock is delivered, an F/F 1*a* to which the clock, delivered through the wiring 30 and inputted, is inputted, and F/F 1*b* to F/F1*h* adjacent to the F/F1*a*. As shown in FIG. 10, the F/F 1*a* is comprised of a clock output terminal 21, and an internal wiring 17 through which the output terminal 21 and an input terminal 22 is connected through a clock buffer 15*a* and an inverter 15*b*. The F/F1*a* outputs a clock from the output terminal 21 to the F/F1*c* to F/F*h* via wirings 32*c* to 32*h*. Wirings extend from the F/F1*a* to the respective F/F1*b* to F/F1*h* in an equal delay. Also, in order to amplify the clock which the F/F1*a* outputs, the F/F1*a* may internally incorporate a clock buffer. Also, clock buffers inside the F/F1*b* to F/F1*h* may be deleted.

Figure 11:
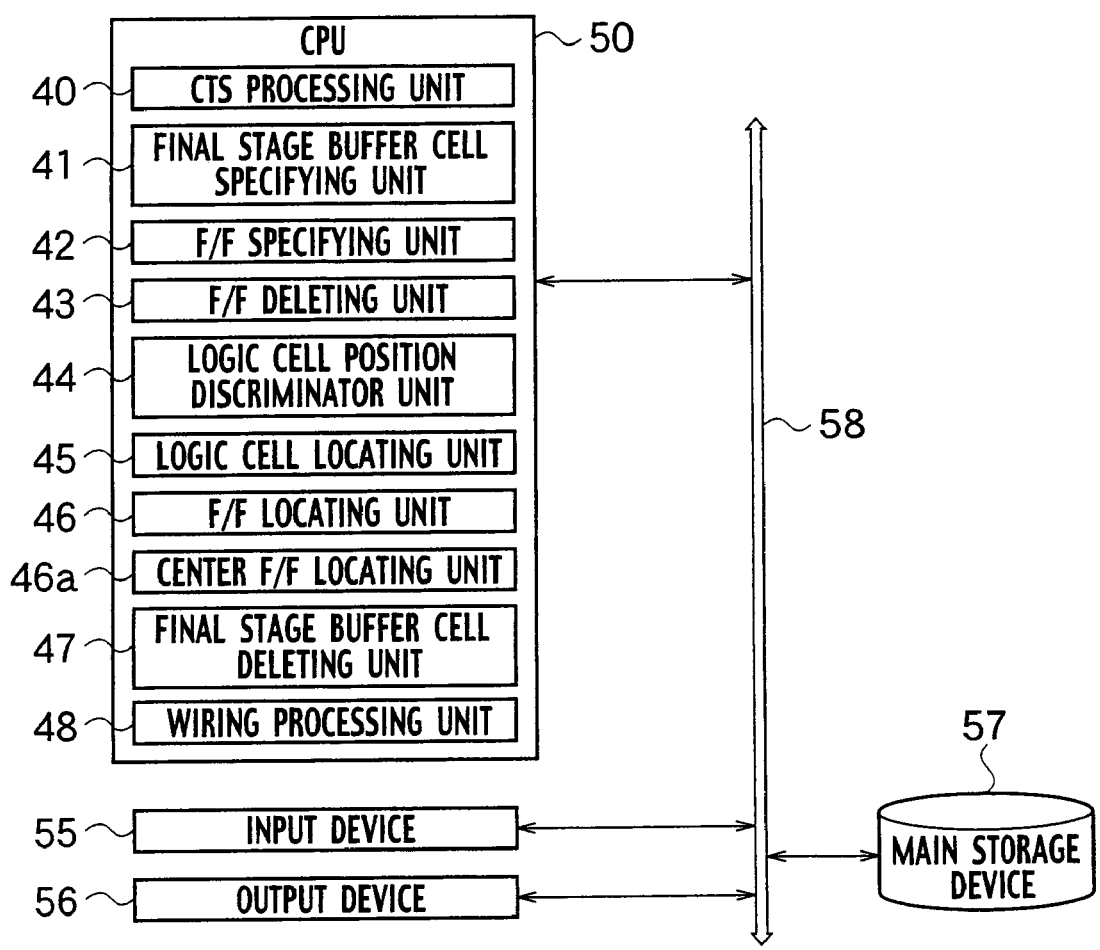
FIG. 11 is a flowchart illustrating one example of a clock skew reduction method of the second embodiment according to the present invention.

As shown in FIG. 11, the clock skew reduction system of the second embodiment according to the present invention is comprised of a bus 58 and an input device 55 connected to the bus 58, an output device 56, a CPU 50, and a main storage device 57. The CPU 50 includes a CTS processing unit 40, a final stage buffer cell specifying unit 41, an F/F specifying unit 42, an F/F deleting unit 43, a logic cell position discriminator unit 44, a logic cell locating unit 45, an F/F locating unit 46, a center F/F locating unit 46*a*, a final stage buffer cell deleting unit 47 and a wiring processing unit 48. The input device 55 inputs a logic circuit, prior to wiring processing, to the main storage device 57 as data. The output device 56 outputs data, stored in the main storage device 57, and data processed in the CPU 50. The main storage device 57 stores data, inputted from the input device 55, and data processed in the CPU 50.

As shown in FIG. 3, the CTS processing unit 40 executes CTS processing, through the wirings 30 and 31*a* to 31*h*, on the F/F1*a* to F/F1*h* of the logic circuit inputted from the input device 55 as data. The final stage buffer cell specifying unit 41 specifies a buffer cell, from which clocks are directly supplied to the F/Fs, in the logic circuit, subjected to the CTS processing, as a final stage buffer 100. The F/F specifying unit 42 specifies the F/F1*a* to F/F1*h* to which the clocks are supplied from the final stage buffer cell 100 specified by the final stage buffer cell specifying unit 41. As shown in FIG. 5, the F/F deleting unit 43 deletes the F/F1*a* to F/F1*h*, specified by the F/F specifying unit 42, and the wirings 31*a* to 31*h* connected to the F/F1*a* to F/F1*h*. The logic cell position discriminator unit 44 discriminates whether there are logic cells 20*a* to 20*d* adjacent to the final stage buffer cell 100 specified by the final stage buffer cell specifying unit 41. As shown in FIG. 4, the logic cell locating unit 45 locates the logic cells 20*a* to 20*d* to positions from which the F/F deleting unit 43 deletes the F/F1*a* to F/F1*h*. The F/F locating unit 46 locates the F/F1*b* to F/F1*h* to the positions adjacent to the F/F1*a* as shown in FIG. 9. The center F/F locating unit 46*a* locates the F/F1*a*, equipped with the output terminal 21 and the internal wiring 17 as shown in FIG. 10, in a position for the final stage buffer cell. The final stage buffer cell deleting unit 47 deletes the final stage buffer cell that is specified by the final stage buffer cell specifying unit 41. The wiring processing unit 48 lays out the wirings 32*b* to 32*h*, connected to the F/F1*b* to F/F1*h*, and other associated wirings.

Figure 12:
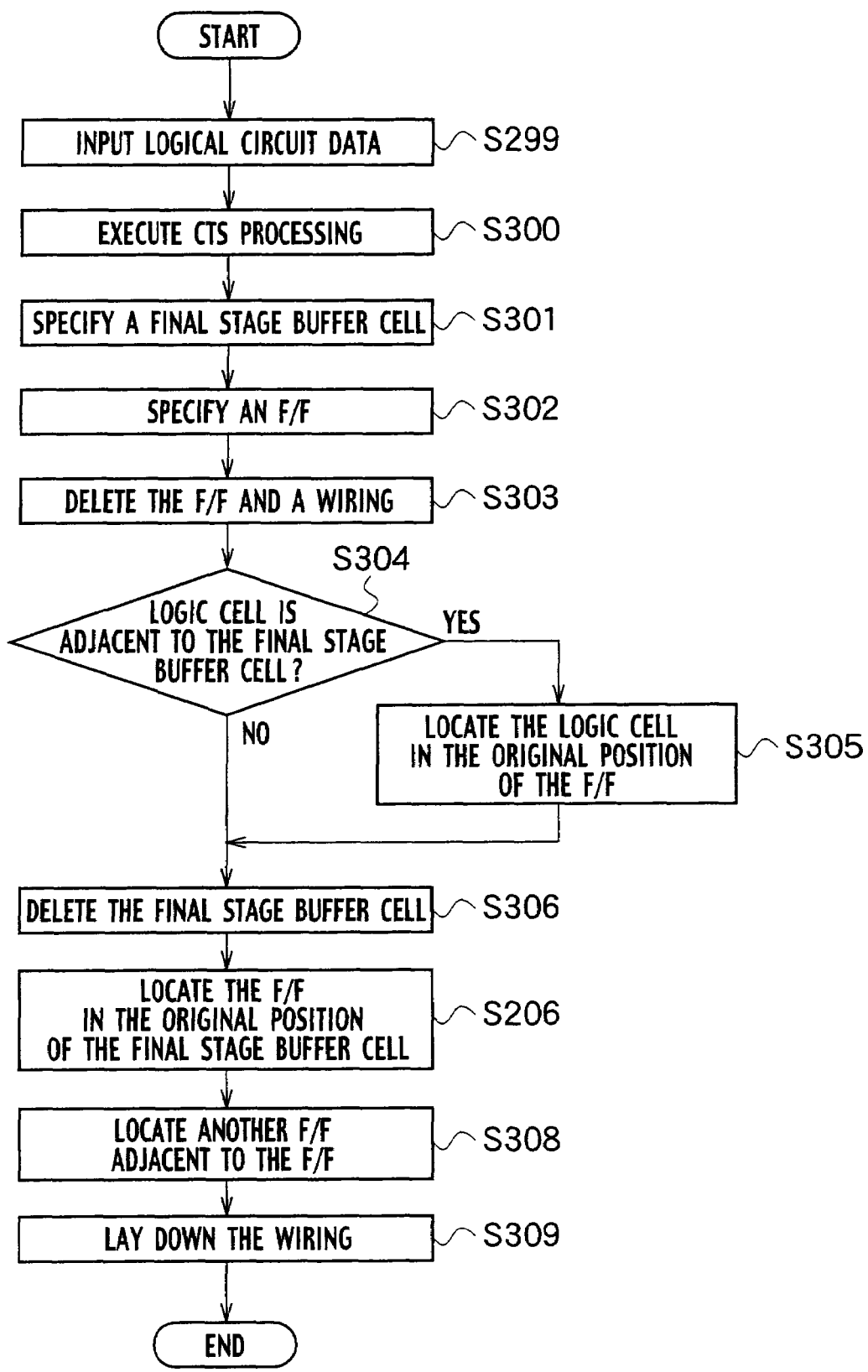
FIG. 12 is a flowchart illustrating one example of the clock skew reduction method of the second embodiment according to the present invention.

Now, referring to FIGS. 3, 5 and 9 to 11, description is made of a clock skew reduction method of the second embodiment according to the present invention shown in FIG. 12.

(a) First, in step S299, the input device 55 stores a logic circuit, prior to executing the wiring processing on the logic circuit, to the main storage device 57 as data. In step S300, the CTS processing unit 40 executes the CTS processing for the F/F1*a* to F/F1*h* of the logic circuit inputted by the input device 55 as shown in FIG. 3. In step S301, the final stage buffer cell specifying unit 41 specifies the buffer cell, from which clocks are directly supplied to F/Fs, as the final stage buffer cell 100 in the logic circuit that is subjected to the CTS processing. In step S302, the F/F specifying unit 42 specifies the F/F1*a* to F/F1*h*, to which the clocks are supplied from the final stage buffer cell 100 specified by the final stage buffer cell specifying unit 41. In step S303, as shown in FIG. 5, the F/F deleting unit 43 deletes the F/F1*a* to F/F1*h* shown in FIG. 3 and the associated wirings 31*a* to 31*h* connected to the F/F1*a* to F/F1*h*.

(b) In step S304, the logic cell position judgment unit 44 discriminates whether there are the logic cells 20*a* to 20*d* adjacent to the final stage buffer cell 100 specified by the final stage buffer cell specifying unit 41. In a case where there are the logic cells adjacent to the final stage buffer cell 100 in step S304, in step S305, the logic cell locating unit 45 locates the logic cells 20*a* to 20*d* adjacent to the final stage buffer cell 100 in the positions from which the F/F1*a* to F/F1*h* are deleted, upon which the operation proceeds to step S306. In the absence of the logic cells adjacent to the final stage buffer cell 100 specified in step S304, the operation proceeds to step S306.

(c) In step S306, the final stage buffer cell deleting unit 47 deletes the final stage buffer cell 100. In step S307, the center F/F locating unit 46*a* locates the F/F1*a*, equipped with the output terminal 21 and the internal wiring 17 as shown in FIG. 10, in a position from which the final stage buffer cell 100 is deleted by the final stage buffer cell deleting unit 47. In step S308, the F/F locating unit 46 allows the F/F1*b* to F/F1*h* to be placed adjacent to the F/F1*a* as shown in FIG. 9. Then, in step S309, the wiring processing unit 48 lays out the wirings 32*b* to 32*h*, connected to the F/F1*b* to F/F1*h* adjacent to the F/F1*a*, and the other wirings (not shown) from the F/F1*a*.

With the logic circuit and the clock skew reduction method of the second embodiment according to the present invention, a distance between the output of the F/F1*a* and clock input pins of the F/F1*b* to F/F1*h* is shortened, resulting in less variations in lengths of the wirings connected between the F/F1*a* and the respective F/F1*b* to F/F1*h*. This results in reduction in crock skew among the F/F1*a* to F/F1*h*. Also, by deleting the final stage buffer cell, a semiconductor chip has a reduced surface area to prevent a drop in an operating speed of a semiconductor integrated circuit, minimizing power consumption of the semiconductor integrated circuit.

Figure 13:
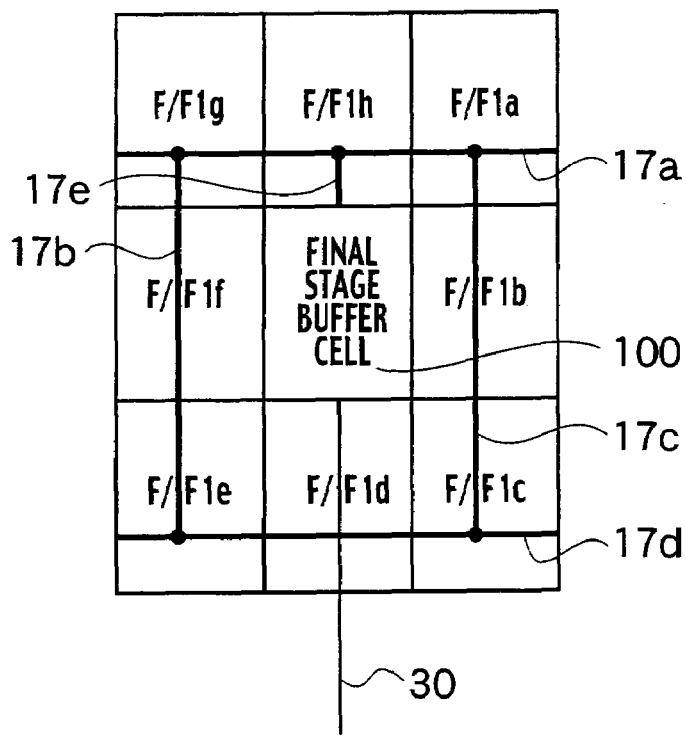
FIG. 13 is a view illustrating one example of F/Fs, which are connected through internal wirings, in the first embodiment according to the present invention.
Figure 14:
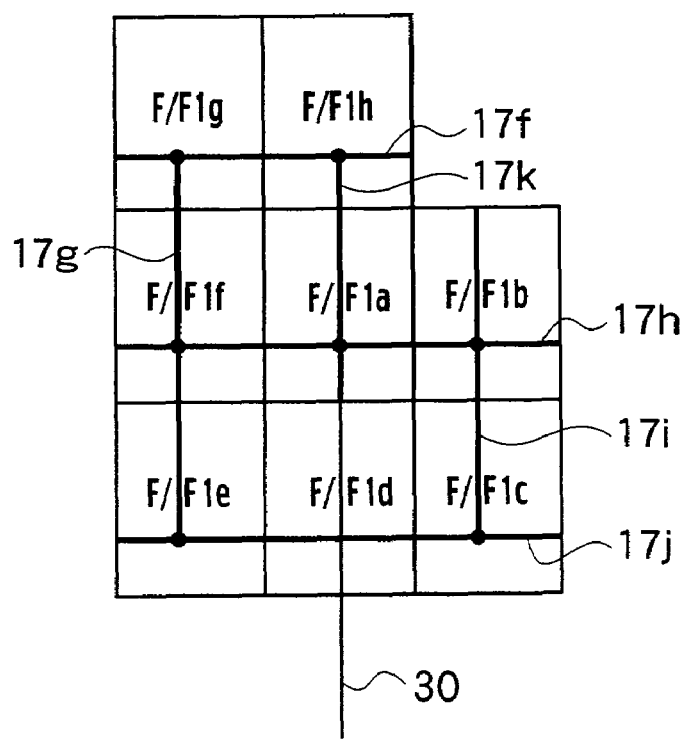
FIG. 14 is a view illustrating one example of F/Fs, which are connected through internal wirings, in the second embodiment according to the present invention.

With the logic circuit of the first embodiment shown in FIG. 1, the F/F1*a* to F/F1*h* include the output terminal 21 and the internal wiring 17 to allow the output terminal to output clocks to the other F/Fs. For instance, as shown in FIG. 13, with the logic circuit of the first embodiment according to the present invention, the F/F1*a* to F/F1*h* may be connected through internal wirings 17*a* to 17*e*. Also, with the logic circuit of the second embodiment according to the present invention shown in FIG. 9, F/F1*b* to F/F1*h* may include the clock output terminal 21 and the internal wiring 17 from which the clocks are outputted to the other F/Fs. For instance, as shown in FIG. 14, with the logic circuit of the second embodiment according to the present invention, the F/F1*a* to F/F1*h* may be connected through internal wirings 17*f* to 17*k*. Merely laying the F/Fs side-by-side allows clock wirings to be completed through internal wirings and no need arises for laying out new clock wirings.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A logic circuit comprising:
    a first flip-flop configured to include a first input terminal introducing a clock signal, a first output terminal supplying the clock signal and a first internal wiring connecting the first input terminal and the first output terminal;
    a wiring connected to each output terminal of a plurality of flip-flops adjacent each other and transmitting the clock signal which was amplified by a final stage buffer cell to a plurality of flip-flops; and
    a second flip-flop configured to be adjacent to the first flip-flop and be supplied with the clock signal from the first output terminal via the wiring.

2. A system for reducing a clock skew comprising:
    a final stage buffer cell specifying unit configured to specify a final stage buffer cell supplying a clock signal in a logic circuit that is subjected to a clock tree synthesis operation;
    an F/F specifying unit configured to specify a plurality of flip-flops to which the clock signal is applied from the final stage buffer cell specified by the final stage buffer cell specifying unit; and
    an F/F locating unit configured to locate the plurality of flip-flops around the final stage buffer cell.

3. A method for reducing a clock skew comprising:
    specifying a final stage buffer cell supplying a clock signal in a logic circuit that is subjected to a clock tree synthesis operation;
    specifying a plurality of flip-flops to which the clock signal is applied from the final stage buffer cell specified by the final stage buffer cell specifying unit; and
    locating the plurality of flip-flops around the final stage buffer cell.

* * * * *